Feb. 11, 1936.     T. F. McCARTHY     2,030,145
LOADING APPARATUS
Filed April 24, 1933     5 Sheets-Sheet 1
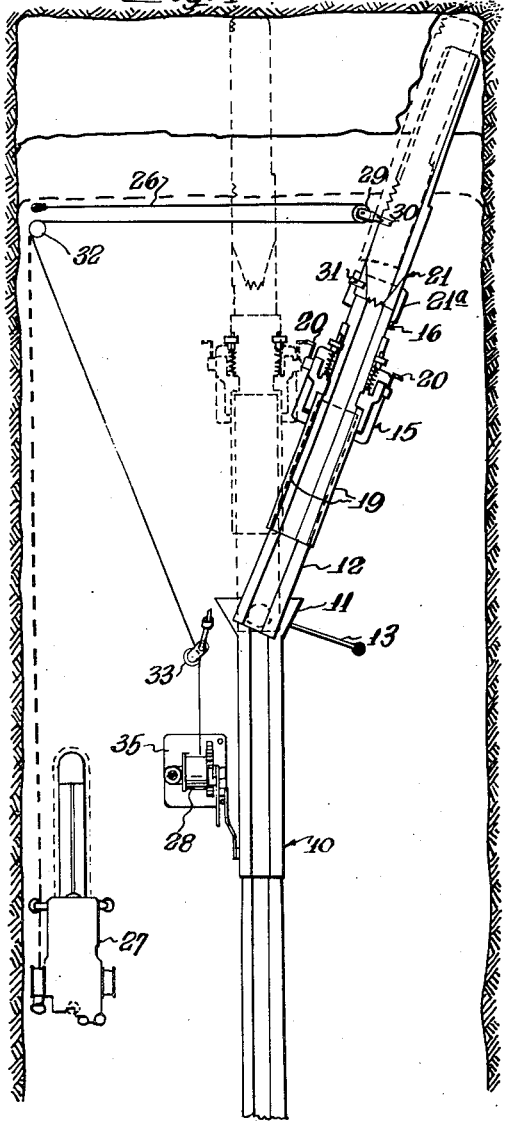
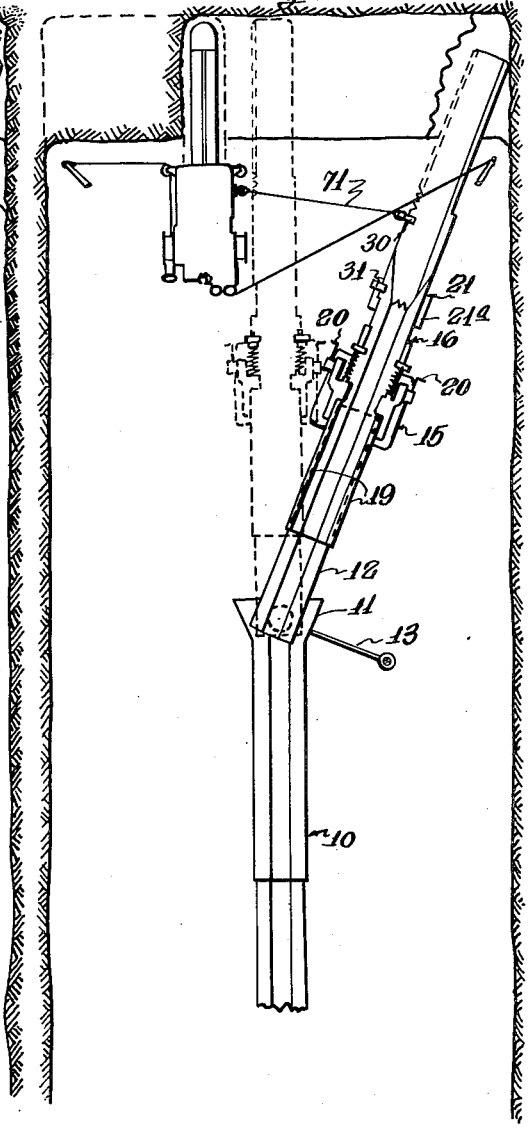
Inventor
Timothy F. McCarthy
Clarence T. Poole
Attorney Feb. 11, 1936.         T. F. McCARTHY         2,030,145
                      LOADING APPARATUS
                   Filed April 24, 1933        5 Sheets-Sheet 2
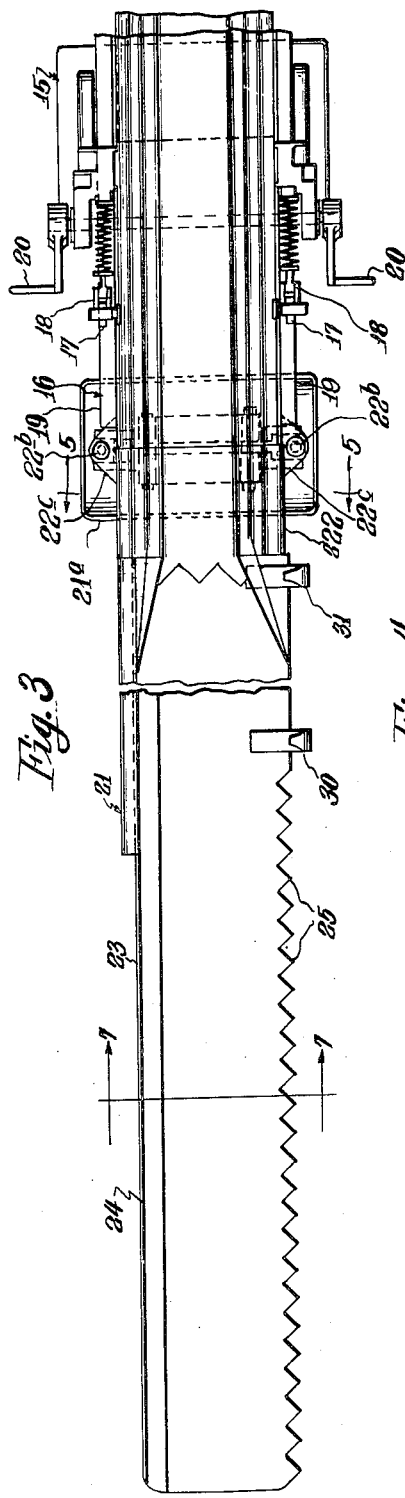
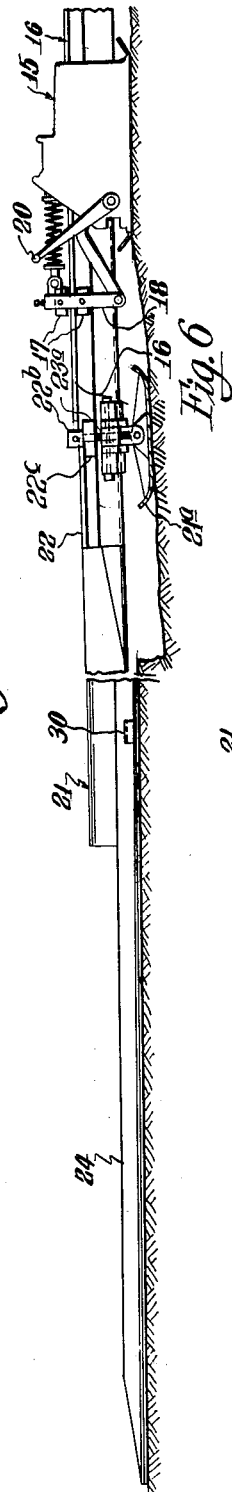
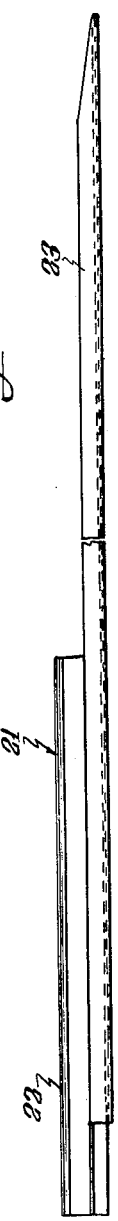
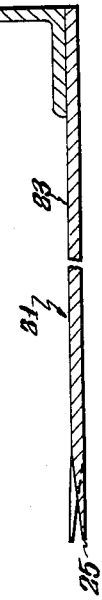
Inventor
Timothy F. McCarthy
Clarence F. Poole
Attorney

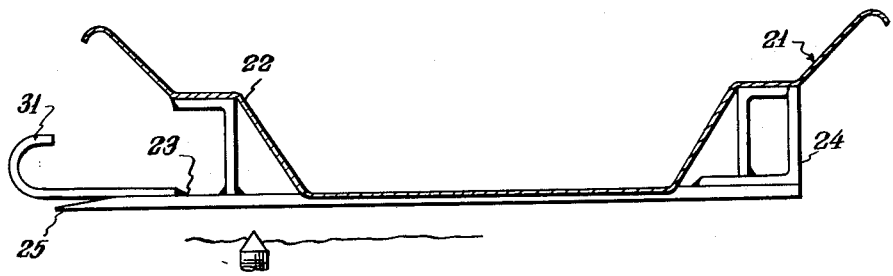
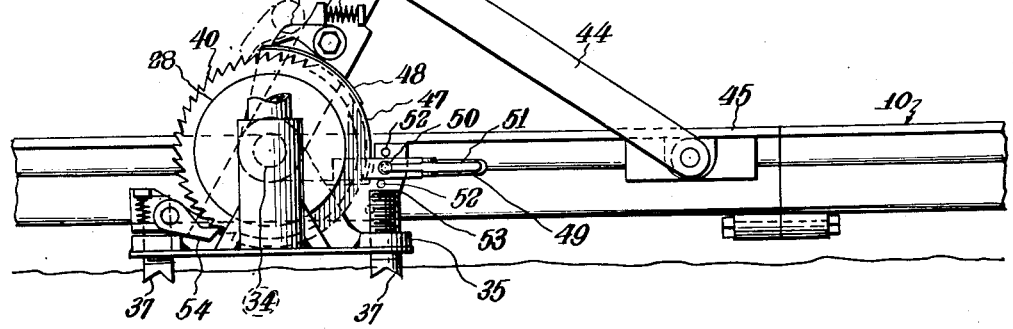
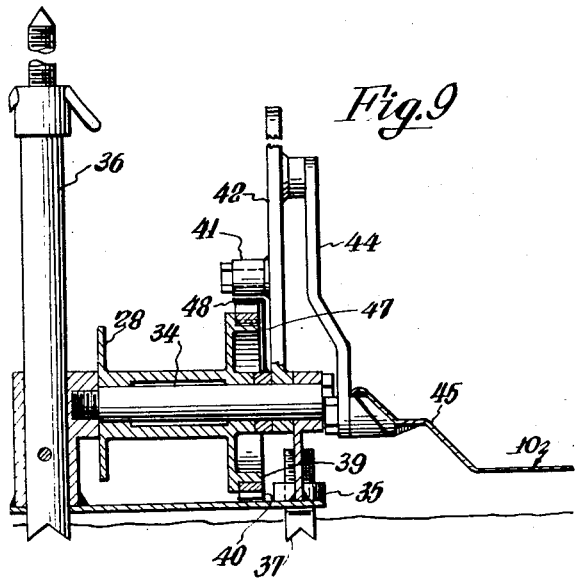

Feb. 11, 1936.   T. F. McCARTHY   2,030,145
LOADING APPARATUS
Filed April 24, 1933   5 Sheets-Sheet 4

Inventor
Timothy F. McCarthy
Clarence F. Poole
Attorney

Feb. 11, 1936.  T. F. McCARTHY  2,030,145
LOADING APPARATUS
Filed April 24, 1933  5 Sheets-Sheet 5
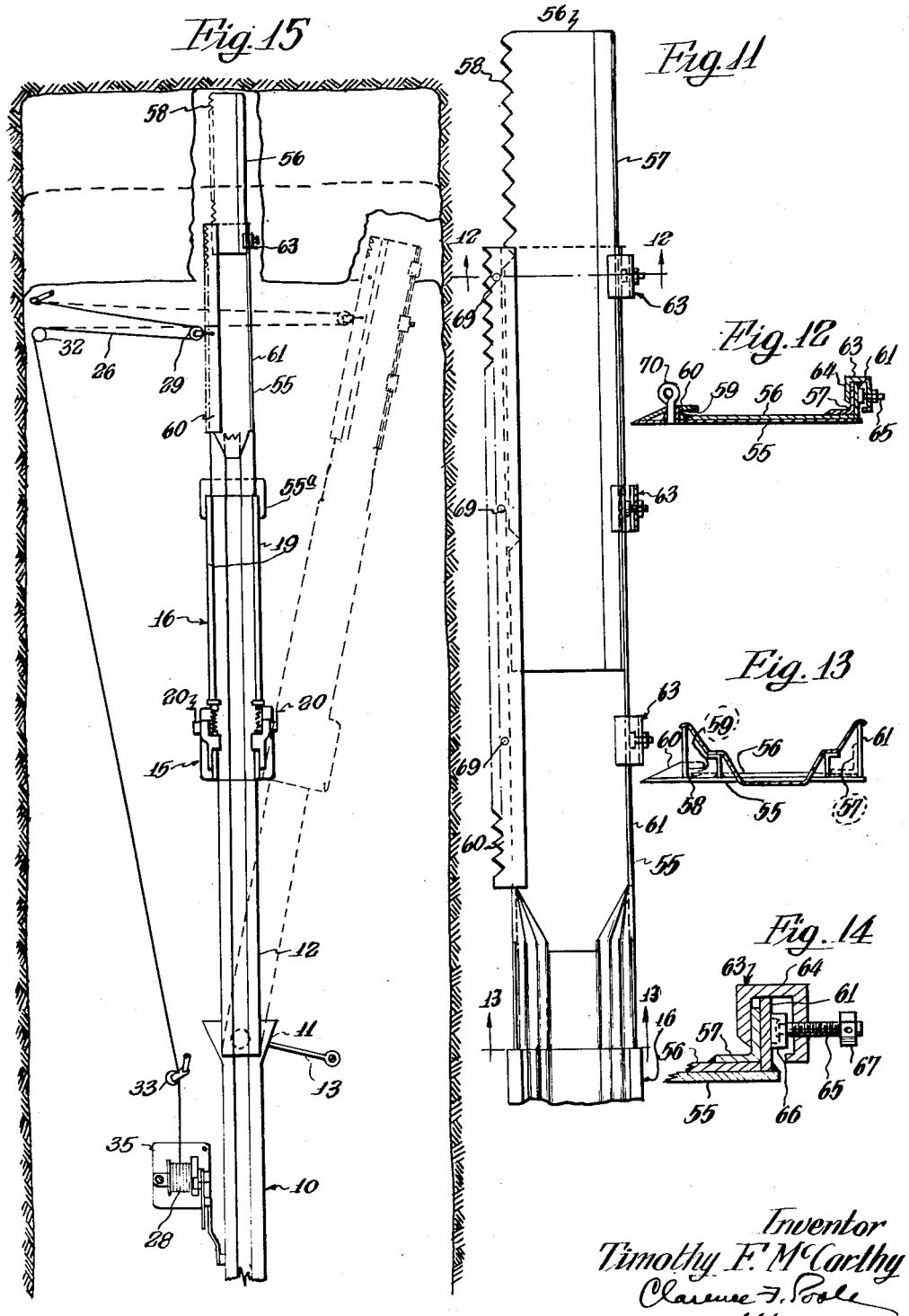
Inventor
Timothy F. McCarthy
Clarence F. Poole
Attorney Patented Feb. 11, 1936

2,030,145

UNITED STATES PATENT OFFICE 2,030,145

LOADING APPARATUS

Timothy F. McCarthy, Indiana, Pa., assignor to Goodman Manufacturing Company, Chicago, Ill., a corporation of Illinois Application April 24, 1933, Serial No. 667,583

14 Claims. (Cl. 198—220)

This invention relates to improvements in loading apparatus, and more particularly to a new and improved apparatus for loading coal or analogous materials, such as slate, chalk, or salt, and has as its principal objects to provide a new and improved apparatus of the class described particularly adapted for operation in places of low vertical height for use with a conveyor of the shaker or jigging type for loading out a complete working place in one continuous operation.

Other objects of my invention will appear from time to time as the following specification proceeds.

My invention may be more clearly understood with reference to the accompanying drawings wherein:

Figure 1 is a diagrammatic view of a device constructed in accordance with my invention positioned in a working place and with the working place shown in horizontal section and parts thereof broken away for illustrating one application of my invention;

Figure 2 is a diagrammatic view illustrating another application of the device embodying my invention than is shown in Figure 1;

Figure 3 is a top plan view of the device embodying my invention showing certain details thereof;

Figure 4 is a side elevation of the device shown in Figure 3;

Figure 5 is an enlarged sectional view taken substantially along line 5—5 of Figure 3;

Figure 6 is a side elevation of the loading pan of the device of my invention;

Figure 7 is a sectional view taken substantially along line 7—7 of Figure 3;

Figure 8 is a detail view showing details of the mechanism for feeding the apparatus across the coal seam;

Figure 9 is a detail sectional view of the device shown in Figure 8;

Figure 11 is an enlarged plan view showing certain details of the loading pan illustrated in Figure 10;

Figure 12 is a sectional view taken substantially along line 12—12 of Figure 11;

Figure 13 is a sectional view taken substantially along line 13—13 of Figure 11;

Figure 14 is an enlarged fragmentary sectional view showing details of the clamping mechanism shown in Figure 12; and Figure 15 is a diagrammatic view showing another form and application of the device of my invention than is shown in Figure 10.

Like numerals refer to like parts throughout the various figures.

Figure 10:
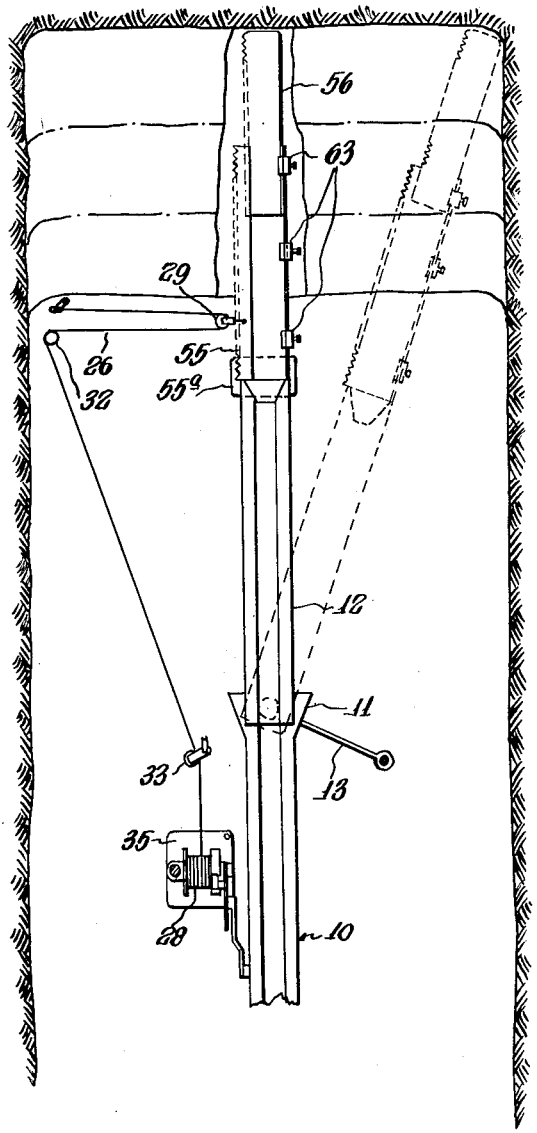
Figure 10 is a diagrammatic view showing another form of the device of my invention than is shown in Figure 1.

In the drawings, the embodiment of my invention illustrated includes a shaker conveyor pan line 10. The pan line 10 is reciprocably driven by suitable drive mechanism in such a manner that it is uniformly accelerated for a greater portion of its forward stroke, quickly reversed, and uniformly decelerated for a greater part of its rearward stroke so that material, such as coal, may readily be moved therealong in a direction away from the working place in a well known manner.

The pan line 10 includes a swivel 11 having an extension trough or pan 12 pivoted thereto for pivotal movement with respect thereto about a vertical axis. The swivel 11 is of a usual construction, so will not herein be described in detail, and is secured in a stationary position on the mine floor by means of an anchor or tension bar 13 and a suitable jack pipe interposed between the mine roof and mine bottom and engaging said tension bar.

The extension trough 12 has a feeder head 15 detachably secured to its forward end in a suitable manner, which feeder head has operative engagement with an extensible trough 16 adapted to be nested in the extension trough 12 and extended from or retracted within said trough by means of the feeder head 15. The feeder head 15 is of a low overall height of a construction well known to those skilled in the art and includes two pairs of grip blocks 17, 17 carried in suitable carriers 18, 18 adapted to engage suitable plates 19, 19 secured to and extending laterally from the extensible trough 16. The grip blocks 17, 17 are engaged with or disengaged from the plates 19 by means of handles 20, 20 on opposite sides of the feeder head 15 having operative connection with the carrier 18 through suitable link and lever mechanism in a well known manner. Thus, when the pan line 10 is reciprocably driven by its drive mechanism and the grip blocks 17, 17 are alternately engaged with and released from the plates 19, 19, the extensible trough 16 will be extended from the extension trough 12 in a usual manner, it being understood that said grip blocks are engaged with the plates 19, 19 upon forward movement of the pan line 10 and disengaged from said plates upon rearward movement of said pan line. It should also be understood that the extensible trough 16 may be retracted within the extension trough 12 by engaging the grip blocks 17, 17 with the plates 19, 19 upon rearward movement of the pan line 10 and disengaging said grip blocks from said plates upon forward movement of said pan line, and that said grip blocks may be locked in engagement with said plates for holding said extensible trough in fixed relation with respect to the extension trough 12 and pan line 10 for reciprocation therewith.

Referring now in particular to the details of the loading mechanism and several of the novel features of my invention, a loading pan 21 is provided for loading the broken down coal into the extensible trough 16 and pan line 10. The loading pan 21 is preferably secured to the forward end of the extensible trough 16 in a suitable manner; as, for instance, by welding or connector bolts, said loading pan herein being preferably shown as being welded to the forward end of said extensible trough. The loading pan 21 includes a rearward trough section 22 and a forward loading section 23 which is in the form of a relatively flat plate having a retaining angle 24 extending along and secured to one side thereof in a suitable manner to retain material thereon when said loading pan is being moved across the coal face during the loading operation. The other, or advance side, of the loading section 23 of the loading pan 21 is provided with saw teeth 25 for agitating and cutting through the broken down material as said loading pan is moved laterally along the working place beneath the broken down material. The loading pan 21 is of such vertical dimensions that it may be inserted in a kerf cut by an ordinary room and pillar or bottom cutting machine and is adapted to rest on the kerf bottom so that the coal may be shot down on said pan for loading when inserted in the kerf.

Means are provided for adjustably supporting the rearward end of the loading pan 21 to permit said loading pan to rest on the kerf bottom where the kerf is above the mine bottom or where the mine bottom is uneven (see Fig. 4). Said means may be of any type, but is herein preferably shown as being an adjustable shoe 21a. The adjustable shoe 21a is adapted to rest on the mine floor and is preferably positioned beneath the rearward end of the trough section 22 of the loading pan 21 and adjustably supports said trough section by means of threaded members 22b, 22b, herein shown as being journaled in members 22c, 22c, extending laterally from each side of said trough section. The threaded members 22b, 22b are held from vertical movement with respect to the members 22c, 22c in a usual manner and are threaded through suitable nuts 23a, 23a, which nuts in turn have a suitable connection with the trough section 22 and adjustable shoe 21a in such a manner that rotation of either or both of the threaded members 22b, 22b will vertically adjust the rearward end of the trough section 22 with respect to the shoe 21a and so that said trough section may be pivotally moved with respect to said shoe about axes extending longitudinally and transversely thereof.

Suitable means are provided for feeding the loading pan 21 across the coal face about the axis of the swivel 11, which may be of any type but which is herein preferably shown as being a flexible feeding member 26. The flexible feeding member 26 may be wound on a suitable winding drum and connected to the loading pan 21; such as the winding drum of a mining machine of the room and pillar type indicated by reference character 27, or any other type of winding drum. In the preferred form of construction shown, however, I utilize a winding drum 28 driven from the shaker conveyor pan line 10 and I preferably secure a free end of the flexible feeding member 26 to a suitable jack disposed adjacent the advance rib of the working place. The flexible feeding member 26 is then preferably trained around a suitable sheave 29 adapted to be detachably secured to the loading pan 21 by hooks 30 or 31. From the sheave 29, the flexible feeding member 26 may be trained toward the advance rib around a sheave 32 and thence rearwardly around a sheave 33 to the winding drum 28.

With reference now to the details of the preferred form of mechanism for feeding the loading pan 21 across the coal face, the winding drum 28 is carried on a shaft 34 for free rotation with respect thereto about a horizontal axis, which shaft in turn is secured to a frame member 35 in a usual manner. The frame member 35 is adapted to be held in a stationary position with respect to the mine bottom by means of a suitable roof jack 36 and is held from movement with respect to the mine bottom by means of pedestals 37, 37 adapted to adjustably engage the bottom. The winding drum 28 is provided with a flanged portion 39 extending outwardly from its inner flange, which flanged portion has a ratchet 40 secured thereto. The ratchet 40 is adapted to be engaged by a pawl 41 pivotally secured to a lever arm 42 in a suitable manner and held in engagement with said ratchet by means of a compression spring 43. The lever arm 42 is carried on the shaft 34 for pivotal movement with respect thereto. A connecting arm 44 is pivotally secured to the lever arm 42 and has pivotal connection with a pan 45 of the pan line 10 in a suitable manner so that reciprocable movement of the pan line 10 will cause reciprocable movement of the lever arm 42 about the center of the shaft 34. A shield 47 is carried on the shaft 34 for adjustable movement thereabout and has a laterally extending portion 48 extending over the teeth of the ratchet 40. The function of the shield 47 is to regulate the distance the ratchet 40 is moved by the pawl 41 per stroke of the lever arm 42 and thus regulate the speed of travel of the winding drum 28. The shield 47 is adjustable about the axis of the shaft 34 to hold the pawl 41 in a disengaged position from the ratchet 40 or to permit said pawl to engage the ratchet 40 and move said ratchet a distance of one, two, three, or any desired number of teeth per stroke of the lever arm 42 depending upon the length of the stroke of said lever arm which also may be adjusted by connecting the connecting arm 44 to said lever arm in different positions than are shown in the drawings to lengthen or shorten the stroke of said lever arm. A suitable means is provided for controlling the position of the shield 47 with respect to the ratchet 40, which may be of any type but which herein comprises a lever arm 49 carrying a pin 50 operated by a suitable lever 51 in a usual manner for engagement with any one of a plurality of apertures 52 on a sector member 53 secured to the frame member 35. Means are also provided to prevent rotation of the winding drum 28 in a direction opposite from the direction it is being driven, which may be of any type but which, as herein preferably shown, comprises a spring pressed dog 54 carried on the frame member 35 for engagement with the teeth of the ratchet 40.

It is thus apparent that the winding drum 28 may be rotatably driven at a plurality of predetermined speeds upon reciprocation of the pan line 10 and that said winding drum may serve as a simplified, compact means for feeding the loading pan 21 across the face of the coal as it is being reciprocated and performing the loading operation.

Referring now in particular to Figures 10, 11, 12, 13, 14, and 15, and several other novel features of my invention; as shown in Figures 11 and 15, the extensible trough 16 has a guide pan 55 secured to its forward end in a suitable manner, such as welding or nuts and bolts. The rearward end of the guide pan 55 may be adjustably supported on an adjustable shoe 55a in the same manner that the loading pan 21 is supported adjacent its rearward end on the adjustable shoe 21a to permit said guide pan to rest on the kerf bottom during the loading operation where the mine bottom is uneven or where the kerf bottom is above the mine bottom. The guide pan 55 is adapted to carry a loading pan 56 for slidable movement with respect thereto so said loading pan may be telescoped within said guide pan or extended therefrom.

The loading pan 56 is constructed in a manner similar to the loading pan 21 and is provided with a retaining angle 57 at the retreating side thereof and has an advance serrated edge 58. The advance serrated edge 58 of the loading pan 56 is adapted to be slidably received in a groove 59 formed by a beveled member 60 secured to and extending along the guide pan 55 on the advance side thereof so that material engaged by said beveled edge will ride thereover into the guide pan 55. The advance edge of the guide pan 55 may likewise be serrated, as is shown in Figure 11, so said guide pan may be used as a loading pan as well as the loading pan 56. The retaining angle 57, on the retreating side of the loading pan 56, is adapted to abut and slidably engage a vertical retaining wall 61 secured to the retreating side of the guide pan 55 in a suitable manner.

Suitable holding means, such as clamps 63, 63, are provided for holding the loading pan 56 in fixed relation with respect to the guide pan 55. The clamps 63, 63 may be of any construction, but as herein shown comprise channeled members 64, 64 adapted to engage the inner side of the retaining angle 57 and rest on the top of the retaining wall 61. Each clamp 63 is clamped to the retaining angle 57 and wall 61 for clamping said retaining wall and angle together by means of a suitable threaded member 65 threaded through the outer side of said clamp and having a head 66 carried for pivotal movement with respect thereto engageable with the outer side of the retaining wall 61. A head 67 is secured to the outer end of the threaded member 65 for engagement by a suitable wrench or other operating member for tightening the clamp 63 against or loosening said clamp from the retaining angle 57 and wall 61. Any number of clamps 63 may be provided, but as herein shown three of such clamps are provided.

Thus, the loading pan 56 may be extended from or retracted within the guide pan 55 and held in various extended positions with respect thereto. With such an arrangement, the loading pan 56 may be advanced as the coal face is advanced without advancing the swivel 11, extension trough 12, and lengthening the conveyor pan line 10.

The beveled member 60 is provided with a plurality of threaded apertures 69 therein which are adapted to receive a threaded eye-piece 70 for connecting the flexible feeding member 26 thereto at various positions therealong or for securing a sideboard thereto (not shown) so the guide pan 55 may form a trough when the loading pan 56 is extended forwardly therefrom.

In Figure 10, the guide pan 55 is shown as being connected to the end of the extension pan 12. The rearward end of the guide pan 55 is shown as being supported on an adjustable shoe 55a for vertical adjustment with respect thereto and for pivotal movement with respect thereto about both transverse and longitudinal axes in a manner similar to which the rearward end of the loading pan 21 is supported on the shoe 21a, although said shoe is not necessary under all operating conditions. With the arrangement shown in Figure 10, it may be seen that the loading operation may be performed in a simplified and effective manner without the use of the feeder head 15.

With reference now to Figures 1, 2, 10 and 15 in particular and the use and operation of the device embodying my invention, the pan line 10 is usually positioned at right angles to the working face and in the central portion thereof. After the working face has been undercut, the loading pan 21 may be inserted therein, preferably by means of the feeder head 15 in a well known manner, as is shown by dotted lines in Figure 1. The loading pan 21 being in the kerf the desired distance and resting on the kerf bottom, the shaker conveyor drive mechanism is usually put in operation for reciprocating the pan line 10 and the loading pan 21. The undercut coal or material may then be broken down on to the loading pan 21. When the drive is put in operation, the loading pan is usually in a locked position with respect to the trough 12 but is capable of being extended or retracted with respect thereto by the feeder head 15 during reciprocation or feeding movement of the pan line to compensate for angular movement of said loading pan about the axis of the swivel 11 so said loading pan may gather a maximum amount of material and clear the solid mine wall as it is being fed across the working face.

Assuming the flexible feeding member 26 to be operatively connected to the loading pan 21 in the hereinbefore described manner, said loading pan may then be advanced across the working place by means of said flexible feeding member as it is being reciprocably driven by the shaker conveyor pan line 10, said flexible feeding member either being wound on a winding drum of the mining machine 27 or the winding drum 28 driven from the pan line 10. As the loading pan 21 is advanced across the coal face, it may be moved in a rearward direction by the feeder head 15 to prevent the forward end of said loading pan from fouling with the solid mine wall. The loading pan 21, being reciprocated by the conveyor pan line 10 and being fed along the working place, will move coal thereon rearwardly therealong to the extensible trough 16, extension trough 12, and pan line 10 by reciprocation of said pan line in an obvious manner. The saw teeth 25 of the loading pan 21 are disposed adjacent the mine bottom and tend to agitate and loosen or cut through any coal which may be wedged between the mine top and the bottom and keep the coal in an agitated state so it may readily be loaded by the loading pan 21. The face being completely loaded out, the kerf may again be undercut and the loading pan 21 may be positioned as formerly under the face of the coal for loading out another cut, said loading pan being advanced to this new position by means of the feeder head 15.

It should be understood that with the arrangement shown in Figure 10, the loading operation is similar to that described with reference to the mechanism shown in Figure 1 but that the extension of the loading pan 56 from the guide pan 55 is regulated by the clamps 63, 63. It should also be understood that the first cut and part of the second cut may be loaded out by the guide pan 55, its serrated edge acting as a material agitating and cutting means in the same manner that the serrated edge 58 of the loading pan 56 acts as a material agitating and cutting means.

Figure 2 shows an application of the device of my invention for cleaning out the cuttings left in the kerf by the mining machine cutter bar. Such an operation is particularly advantageous where the cutter bar is cutting through a dirty band of coal or is cutting in the bottom. In cleaning out the cuttings from the kerf, the loading pan 21 may either be connected to the mining machine so as to be moved therewith after the initial sumping cut has been made and load the slack cuttings as they are discharged from the cutter chain, thus dispensing with a man for shoveling the slack, or said loading pan may follow the mining machine after it has cut across the working face a considerable distance. As has herein preferably been shown, the mining machine 27 has been sumped into the coal and cut across the face for a considerable distance. The mining machine may then be stopped and a connecting member 71, herein shown as being a flexible cable, may then be connected between the mining machine 27 and loading pan 21 for moving said loading pan therewith while being reciprocated by the pan line 10 as the mining machine completes the kerf across the coal face. The mining machine 27 may then be withdrawn from the coal seam and complete the loading of the cuttings by pulling the loading pan 21 the remaining distance across the coal face by means of its feeding cable in an obvious manner. Said loading pan may then be withdrawn from the kerf in any suitable manner but preferably by means of the feeder head 15, or it may be returned to its initial position in the kerf adjacent the retreating rib for loading out the coal in the same manner as is shown in Figure 1. While the connecting member 71 is herein preferably shown as being relatively long, it may be shortened or lengthened as desired according to the mining conditions encountered. Where cutting conditions are suitable, the tail rope of the mining machine may be substituted for the connecting member 71, and where said tail rope is power driven it may be used to feed the loading pan 21 across the coal face when the mining machine cutter bar is sumped therein and held from movement with respect to the coal face. It is apparent that where it is not desired to use the feeder head 15, that the arrangement shown in Figure 10 may be used in place of the loading arrangement shown in Figure 2.

With reference now to Figure 15, the loading operation is performed in the same manner as in Figure 1 with the exception that the conveyor pan line 10 and swivel 11 is not moved as the working face advances. As is shown by solid lines, the loading pan 56 is fully extended and inserted under the kerf for loading and, as shown by dotted lines, is retracted within the guide pan 55, but with the extensible trough 16 extended with respect to the extension trough 12. It is readily apparent that when the extensible trough 16 is nested within the extension trough 12 and the loading pan 56 is retracted within the guide pan 55, that the total amount of extension of the loading mechanism is the amount which the extensible trough 16 may be extended from the extension trough 12 plus the amount which the loading pan 56 may be extended from the guide pan 55. With such an arrangement, the undercut coal may be practically loaded for many more cutting operations without moving the swivel 11 or lengthening the conveyor pan line 10 than with the arrangements shown in Figures 1 and 10. As has been stated with reference to Figure 10, the guide pan 55 having the loading pan 56 telescoped therein may serve as a loading pan for the first undercut and part of the second undercut.

While the device of my invention is herein preferably shown as resting on and operating adjacent the mine bottom, it should be understood that it may operate as effectively above the mine bottom, and that it may be effectively used for cleaning the cuttings from a kerf at substantially any desired elevation above the mine bottom as well as for loading various strata in the coal seam at various elevations above the mine bottom. It should also be understood that the device of my invention may be used in conjunction with track-mounted machines adapted to cut an arcuate kerf adjacent the mine bottom or at various elevations with respect thereto as well as with a machine of the shortwall or longwall type.

It may now be seen that a new and improved loading apparatus of a minimum vertical height has been provided together with a new and improved method of loading which is particularly adapted for use in low coal, although not limited to such use, and which permits the continuous loading of the cuttings or the complete coal seam in a simplified manner after it has been undercut and shot, and that this apparatus is of a simplified and efficient construction of great flexibility and adaptability to varying mining conditions.

While I have herein shown and described one form of my invention, I do not wish to be limited to the precise details of construction or arrangement of parts herein shown and described, excepting as specifically limited in the appended claims.

I claim as my invention:

1. In a loading apparatus, a shaker conveyor, a pan on the forward end of said shaker conveyor extending forwardly therefrom and being adapted to rest on the kerf bottom and be inserted in a kerf cut in a coal face, said pan having an open advance side and forward end substantially parallel to the kerf bottom and a retaining member on the retreating side thereof and being adapted to load while buried in the coal by feeding movement across the coal face while being reciprocated by said shaker conveyor.

2. In an apparatus of the class described, a shaker conveyor pan line, an extensible pan adapted to be nested in or extended forwardly from said pan line, a loading pan carried by said extensible pan for insertion in a kerf cut in a working face, said pan having an open advance side and forward end substantially parallel to the kerf bottom and a retaining member on the retreating side thereof, means for feeding said loading pan across the working face, and manually controllable extension and retraction mechanism for extending or retracting said extension pan with respect to said pan line while said shaker conveyor pan line is in operation.

3. In an apparatus of the class described, a shaker conveyor pan line, an extensible pan adapted to be nested in or extending forwardly from said pan line, a loading pan carried by said extensible pan for insertion in a kerf cut in a working face, said pan having an open advance side and forward end substantially parallel to the kerf bottom and a retaining member on the retreating side thereof, means for feeding said loading pan across the working face, and means operable under manual control having connection with said pan line and selective operable connection with said extensible pan for extending or retracting said extensible pan with respect to said pan line at will during reciprocable movement of said pan line.

4. In a loading device for coal mines, a shaker conveyor pan line including a swivel, a pan carried on the forward end of said shaker conveyor pan line for extensible or retractable movement with respect thereto, and means driven by said shaker conveyor pan line for feeding said pan across the coal face about the axis of said swivel while being reciprocated by said shaker conveyor pan line comprising a winding drum, a flexible feeding member thereon having connection with said pan, and a connection between said shaker conveyor pan line and winding drum for transferring the rectilinear movement of said shaker conveyor into rotational movement for actuating said drum.

5. In a shaker conveyor, a shaker conveyor pan line including a swivel and an extension pan connected to and extending forwardly of said swivel, and means insertable in a kerf in the coal seam for loading material therefrom comprising a loading pan having an advance agitating edge and a retreating retaining side and having connection with said extension pan for extensible or retractable movement with respect thereto, and means for feeding said loading pan across the coal face while being reciprocated by said shaker conveyor pan line.

6. In a shaker conveyor, a shaker conveyor pan line including a swivel and an extension pan connected to and extending forwardly of said swivel, and means insertable in a kerf in the coal seam for loading material therefrom comprising a loading pan having an advance agitating edge and a retreating retaining side and having connection with said extension pan for extensible or retractable movement with respect thereto, and means driven by said shaker conveyor pan line for feeding said loading pan across the coal face while being reciprocated by said shaker conveyor pan line.

7. In a shaker conveyor, a shaker conveyor pan line including a swivel and an extension pan connected to and extending forwardly of said swivel, and means insertable in a kerf in a coal seam for loading material therefrom comprising a telescopic loading pan having connection with said extension pan for extensible or retractable movement with respect thereto, said telescopic loading pan including a relatively flat forward extensible section adapted to rest on the mine bottom having an open advance side and forward end and a closed retreating side, means for holding said telescopic loading pan in various positions of extension with respect to said extension pan, and means for feeding said loading pan across the coal face while being reciprocated by said shaker conveyor pan line.

8. In a shaker conveyor, a shaker conveyor pan line including a swivel and an extension pan connected to and extending forwardly of said swivel, and means insertable in a kerf in a coal seam for loading material therefrom comprising a telescopic loading pan having connection with said extension pan for extensible or retractable movement with respect thereto, said telescopic loading pan including a relatively flat forward extensible section adapted to rest on the mine bottom having an open advance side and forward end and a closed retreating side, means for moving said telescopic loading pan longitudinally with respect to said extension pan or holding said telescopic loading pan in fixed relation with respect thereto comprising a feeder head connected to said extension pan and having operative connection with said telescopic loading pan, and means for feeding said telescopic loading pan across the coal face while being reciprocated by said shaker conveyor pan line.

9. A mechanism for continuously loading coal comprising a shaker conveyor including a shaker conveyor pan line having a swivel therein, and a loading pan having an advance serrated cutting edge adapted to lie along the mine bottom and being adapted to be connected to the forward end of said shaker conveyor pan line and inserted in a kerf cut in the coal seam and be fed across the coal face after the coal has been shot down thereon while said pan is being reciprocated by said shaker conveyor.

10. A mechanism for continuously loading coal comprising a shaker conveyor including a shaker conveyor pan line having a swivel therein, and a loading pan having a serrated cutting edge adapted to be connected to the forward end of said shaker conveyor pan line and inserted in a kerf cut in the coal seam and be fed across the coal face after the coal has been shot down thereon while said pan is being reciprocated by said shaker conveyor, and a feeder head for longitudinally moving said loading pan with respect to the coal face for extending or retracting said loading pan with respect thereto.

11. In an apparatus of the class described, a shaker conveyor pan line including a swivel, and an extension pan connected to and extending forwardly of said swivel, an extensible pan adapted to be nested in or extended forwardly from said extension pan, a loading pan carried by said extensible pan for insertion in a kerf cut in a working face having an advance side and forward end adapted to lie along the mine bottom and a retaining member on the retreating side thereof, means for feeding said loading pan across the working face, and means operable under manual control having connection with said extension pan and selective operable connection with said extensible pan for holding said extensible pan in fixed relation with respect to said extension pan and extending or retracting said extensible pan with respect to said extension pan at will during reciprocable movement of said extension pan.

12. In a loading apparatus, a shaker conveyor, a pan on the forward end of said shaker conveyor extending forwardly therefrom and being adapted to rest on the mine bottom and be inserted in a kerf cut in the coal face, and means driven by said shaker conveyor for feeding said pan across the coal face while being reciprocated by said shaker conveyor comprising a winding drum, a flexible feeding member thereon having connection with said pan, and a connection between said shaker conveyor and winding drum for transferring the rectilinear movement of said shaker conveyor into rotational movement for actuating said drum.

13. A mechanism for continuously loading coal comprising a shaker conveyor including a shaker conveyor pan line having a swivel therein, and a loading pan having a serrated cutting edge adapted to be connected to the forward end of said shaker conveyor pan line and be inserted in a kerf cut in the coal seam and be fed across the coal face after the coal has been shot down thereon while said pan is being reciprocated by said shaker conveyor, a feeder head for longitudinally moving said loading pan with respect to the coal face for extending or retracting said loading pan with respect thereto, and means driven by said shaker conveyor for feeding said loading pan across said coal face while being reciprocated and while inserted therein including a flexible feeding member.

14. In a shaker conveyor, a shaker conveyor pan line including a swivel and an extension pan connected to and extending forwardly of said swivel, and means insertable in a kerf in the coal seam for loading material therefrom comprising a loading pan having an advance agitating edge and a retreating edge and having connection with said extension pan for extensible or retractable movement with respect thereto, and means driven by said shaker conveyor pan line for feeding said loading pan across the coal face while being reciprocated by said shaker conveyor pan line comprising a winding drum, a flexible feeding member adapted to be wound on said winding drum, a connection between said flexible feeding member and said loading pan, and an operative connection between said shaker conveyor and winding drum for transferring the rectilinear movement of said shaker conveyor to rotational movement for actuating said winding drum.

TIMOTHY F. McCARTHY.